United States Patent
Tang

(10) Patent No.: US 8,281,171 B2
(45) Date of Patent: Oct. 2, 2012

(54) ADJUSTMENT OF POWER-SAVING STRATEGY DEPENDING ON WORKING STATE OF CPU

(75) Inventor: Don Tang, Taipei (TW)

(73) Assignee: Via Technologies, Inc., Taipei (TW)

( * ) Notice: Subject to any disclaimer, the term of this patent is extended or adjusted under 35 U.S.C. 154(b) by 1122 days.

(21) Appl. No.: 11/558,354

(22) Filed: Nov. 9, 2006

(65) Prior Publication Data

US 2007/0113114 A1 May 17, 2007

(30) Foreign Application Priority Data

Nov. 17, 2005 (TW) .............................. 94140484 A

(51) Int. Cl.
*G06F 1/00* (2006.01)
(52) U.S. Cl. .................................................. 713/323
(58) Field of Classification Search .................... 713/300
See application file for complete search history.

(56) References Cited

U.S. PATENT DOCUMENTS

| | | | | |
|---|---|---|---|---|
| 4,428,044 A * | 1/1984 | Liron | ............................. | 714/12 |
| 5,657,257 A | 8/1997 | Lee | | |
| 5,808,881 A | 9/1998 | Lee | | |
| 6,360,327 B1 * | 3/2002 | Hobson | ......................... | 713/300 |
| 7,093,141 B2 * | 8/2006 | Elnozahy et al. | ............. | 713/300 |
| 7,308,587 B2 * | 12/2007 | Inui et al. | ...................... | 713/310 |
| 2003/0196127 A1 * | 10/2003 | Olsen | ............................ | 713/300 |
| 2004/0031034 A1 * | 2/2004 | Lewis | ............................ | 718/102 |
| 2005/0120252 A1 * | 6/2005 | Uwatoko | ...................... | 713/300 |
| 2005/0238055 A1 | 10/2005 | Frodsham et al. | | |
| 2006/0200690 A1 * | 9/2006 | Cline et al. | .................... | 713/320 |
| 2007/0005859 A1 * | 1/2007 | Diefenbaugh et al. | ........ | 710/260 |
| 2007/0130382 A1 * | 6/2007 | Moll et al. | ...................... | 710/22 |

FOREIGN PATENT DOCUMENTS

| | | |
|---|---|---|
| TW | 541453 | 7/2003 |
| TW | 591373 | 6/2004 |

* cited by examiner

*Primary Examiner* — Mohammed Rehman
(74) *Attorney, Agent, or Firm* — Kirton McConkie; Evan R. Witt

(57) ABSTRACT

In a method for adjusting power-saving strategy of a peripheral device controller in communication with a CPU, whether the CPU is in a working state while the peripheral device enters a power-saving mode is first determined. Then, interrupt the CPU at relatively short intervals during the power-saving mode if the CPU is in the working state; and interrupt the CPU at relatively long intervals during the power-saving mode if the CPU is not in the working state.

18 Claims, 6 Drawing Sheets

ADJUSTMENT OF POWER-SAVING STRATEGY DEPENDING ON WORKING STATE OF CPU

FIELD OF THE INVENTION

The present invention relates to method and device for adjusting power-saving strategy, and more particularly to method and device for adjusting power-saving strategy of a computer system.

BACKGROUND OF THE INVENTION

A motherboard of a personal computer or a notebook computer is basically constructed by a central processing unit (CPU), a chipset for controlling various devices, and some peripheral circuits. The CPU is the core of the whole computer system. The major tasks of the CPU are processing and controlling of the interactions among parts of the computer system, and logic operations. The chipset consisting of one or more chips assembled in various ways works for coordinating the CPU and peripheral devices. One of the most popular chipset configurations is a combination of two chips. One is so-called as a north bridge chip and the other a south bridge chip. The north bridge takes charge of all hi-speed buses, basically from 2 GBps to 5 GBps, on the motherboard. The south bridge chip is in charge of communications among I/O buses that have relatively slow transmission speed, basically from 10 MBps and 1 GBps. The south bridge chip also communicates with the basic input output system (BIOS) of the computer system.

Referring to FIG. 1, a common configuration of a motherboard 1 is shown. A CPU 11 is coupled to a chipset 12 that consists of a north bridge chip 121 and a south bridge chip 122. The north bridge chip 121 connects to the CPU 11 via a front side bus (FSB) 101, connects to a main memory or system memory 13 via a memory bus 102, and communicates with the accelerated graphics port (AGP) 14 via an AGP bus 103. The south bridge chip 122 connects to a peripheral component interconnect (PCI) interface 15 via a PCI bus 104, and connects to other peripheral devices such as industry standard architecture (ISA) interface 16, universal serial bus (USB) interface 17, integrated drive electronics (IDE) interface 18, mouse 19, and keyboard 20. A newly developed serial advanced technology attachment (SATA) interface 21 is also coupled to the south bridge chip 122.

To operate the computer system normally, the CPU 11 has to be in concert with the north bridge chip 121 and the south bridge chip 122 so that various electronic devices coupled to the chipset via various interfaces, e.g. liquid crystal display, CD-ROM drive, hard disc drive, floppy disc drive, keyboard and mouse, can be well controlled by the CPU 11. For reducing power consumption of the system, it is advantageous to opportunely rest the CPU 11, i.e. enter the CPU 11 into an idle state, when there is no program being executed and no peripheral devices being operated in the computer system for a specified duration.

Nowadays, USB interface has become one of the most popular transmission interfaces due to the features of high speed and easy operation. The USB interface is coupled to a USB host controller 1220 disposed in the south bridge chip to communicate the peripheral device coupled thereto with the south bridge chip 122.

Generally, the USB host controller 1220 has its own power-saving mechanism. When the USB host controller 1220 detects that there is no more task to be executed, an idle state specific to the USB host controller 1220 will be entered. The USB host controller 1220 is then awakened as a result of timing. That is, when the timer 1221 disposed in the USB host controller 1220 determines that a preset time threshold is due, the USB host controller 1220 restores from the idle state and actively reads updated descriptor data from the main memory 13, if any, so as to execute necessary tasks. The accessing operation to the main memory 13 to read the updated descriptor data, on the other hand, will cause the CPU 11 to restore from the CPU idle state. Accordingly, the CPU 11 cannot be rested effectively but has to be redundantly awakened. As a result, the power-saving effect of the computer system is limited.

SUMMARY OF THE INVENTION

Therefore, a method and device for adjusting power-saving strategy are provided.

A method for adjusting power-saving strategy of a computer system includes determining whether a CPU of the computer system is in a working state while a peripheral device coupled to the computer system enters a power-saving mode; interrupting the CPU at relatively short intervals during the power-saving mode if the CPU is in the working state; and interrupting the CPU at relatively long intervals during the power-saving mode if the CPU is not in the working state.

A core logic chip of a computer system includes a power management controller in communication with a CPU of the computer system for detecting a power state of the CPU; and a peripheral device controller in communication with the power management controller and the CPU for interrupting the CPU at relatively short intervals during a power-saving mode thereof if the CPU is in a relatively high power state, and interrupting the CPU at relatively long intervals during the power-saving mode thereof if the CPU is in a relatively low power state.

A computer system with adjustable power-saving strategy includes a CPU being in a power state variable with active peripheral devices supported thereby; one or more peripheral devices functioning with an operation of the CPU; and a core logic chip in communication with the CPU and the peripheral devices. The core logic chip includes a power management controller in communication with the CPU of the computer system for detecting the power state of the CPU; and a peripheral device controller in communication with the power management controller and a peripheral device for interrupting the CPU at relatively short intervals during a power-saving mode of the peripheral device if the CPU is in a relatively high power state, and interrupting the CPU at relatively long intervals during the power-saving mode of the peripheral device if the CPU is in a relatively low power state.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
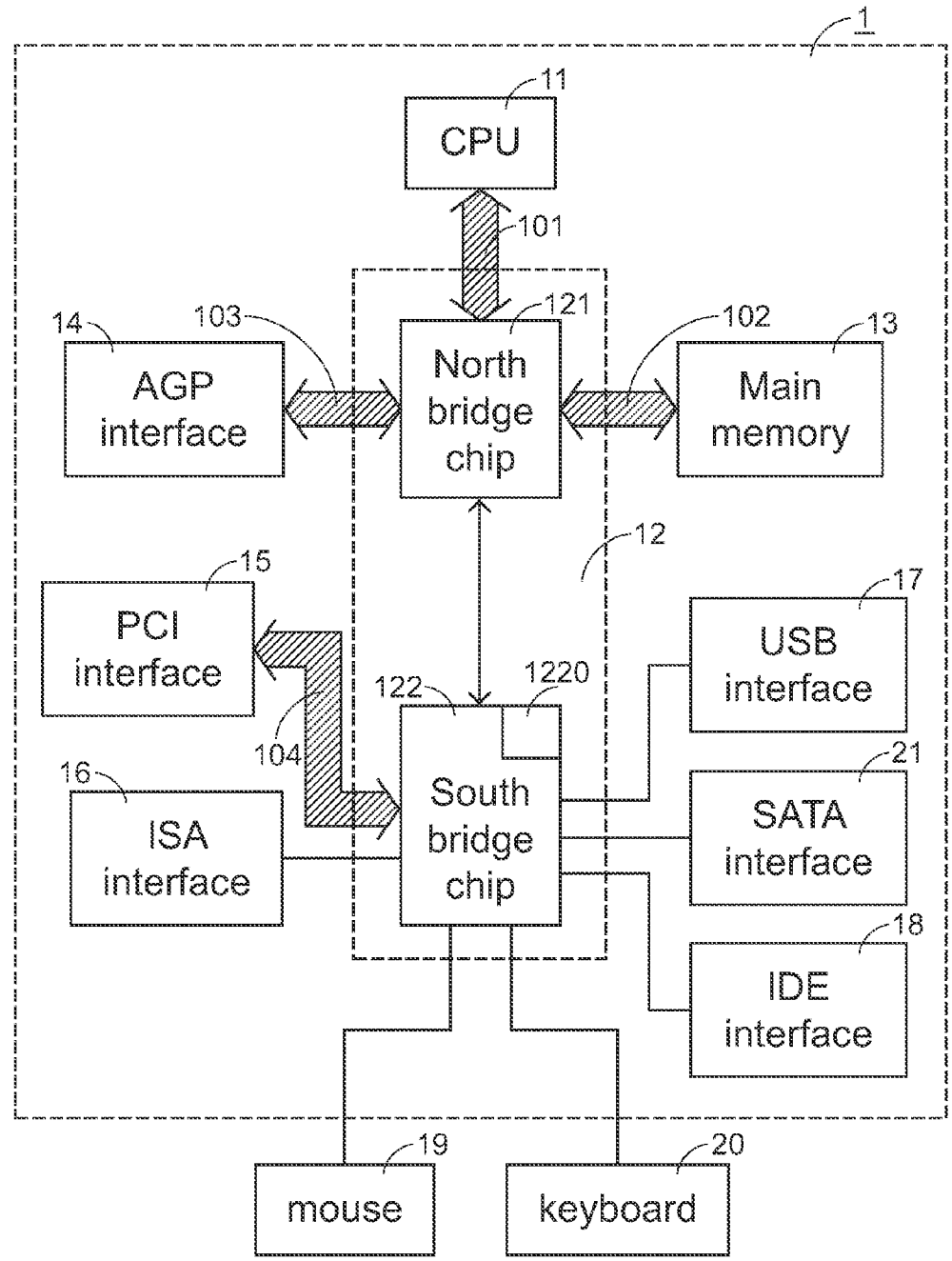
FIG. 1 is a functional block diagram of a typical motherboard of a computer system.
Figure 2:
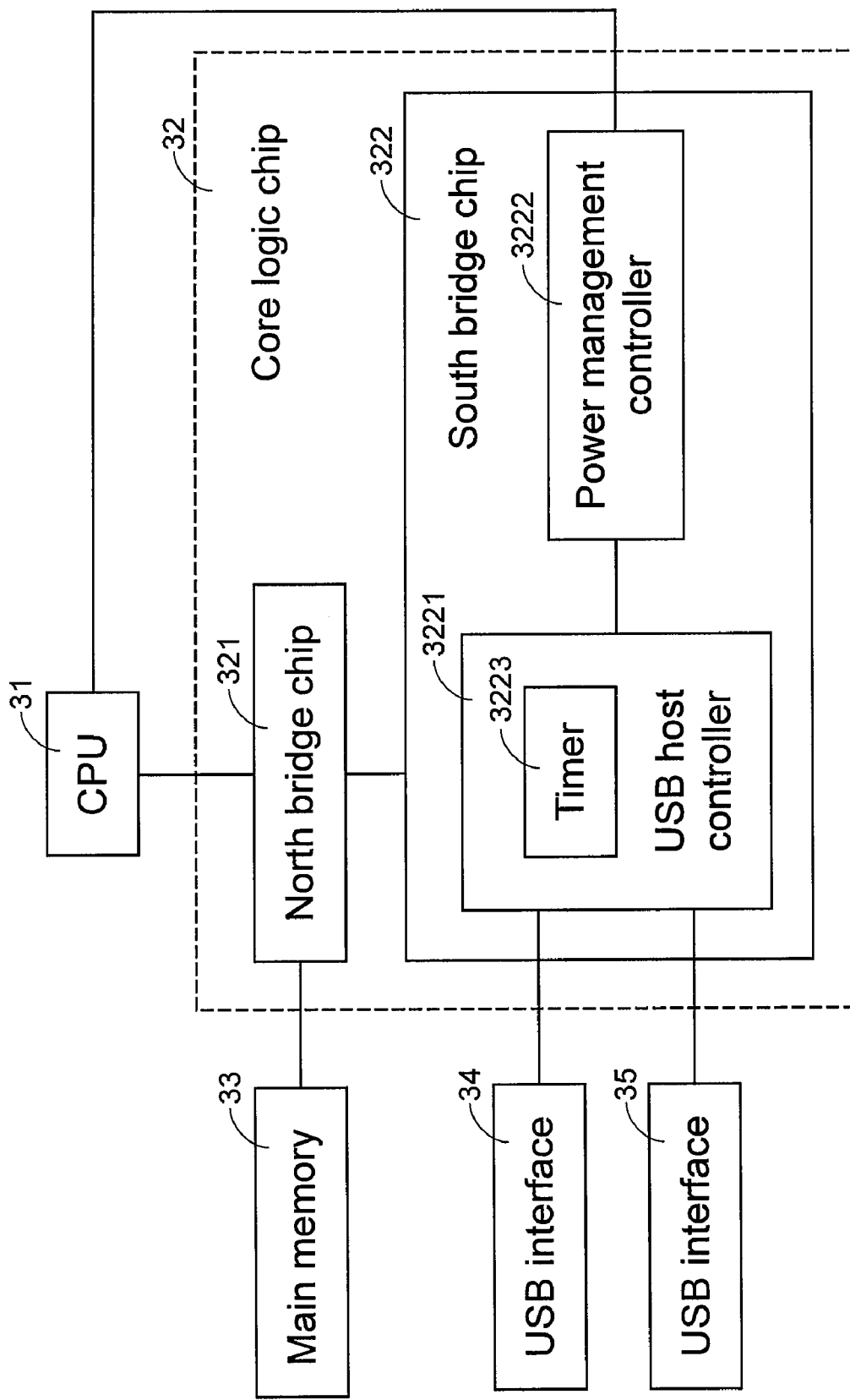
FIG. 2 is a functional block diagram of computer system parts associated with power-saving strategy.

FIG. 2 illustrates devices in a computer system associated with power-saving issues. In a computer system such as a personal computer or a notebook, various devices may involve independent power-saving designs. For example, the CPU 31 enters an idle state when there has been no task executed by the CPU 31 for a specified duration, and the USB host controller 3221 enters a power-saving mode when there is no more task to be executed by the USB host controller 3221 temporarily. However, once the USB host controller 3221 restores from the power-saving mode to execute some task, the idle state of the CPU 31 has to be interrupted by the USB host controller 3221 because the USB devices 34 and/or 35, e.g. mouse, keyboard, printer, joystick devices, etc., need to read descriptor data from the main memory or system memory 33 via the north bridge chip 31 under the control of the CPU 31. As the restoration of the USB host controller 3221 from the power-saving mode responds to a timing result of the timer 3223 disposed in the USB host controller 3221, the USB host controller 3221 might restore while still executing no further task. Under this circumstance, the idle state of the CPU 31 would be redundantly interrupted. Therefore, the present invention adjusts the power-saving strategy of the USB host controller 3221 according to the sate of the CPU 31 so as to meet the practical requirements.

The south bridge chip 322 further includes a power management controller 3222 in communication with the CPU 31 and the USB host controller 3221. The power management controller 3222 detects whether the CPU 31 is in a working state or an idle state so that the power-saving strategy of the USB devices can be adjusted by the USB host controller 3221 according to the detected state of the CPU 31. During the working state of the CPU 31, if the USB host controller 3221 is made to restore from its power-saving mode, it will trigger the CPU 31 to read data at first intervals. On the other hand, during the idle state of the CPU 31, if the USB host controller 3221 is made to restore from its power-saving mode, it will trigger the CPU 31 to read data at second intervals. The second interval is longer than the first interval so that the USB host controller 3221 along with the USB devices 34 and 35 can work with high performance while interrupting the CPU 31 in the idle state less often than in the working state.

Figure 3A:
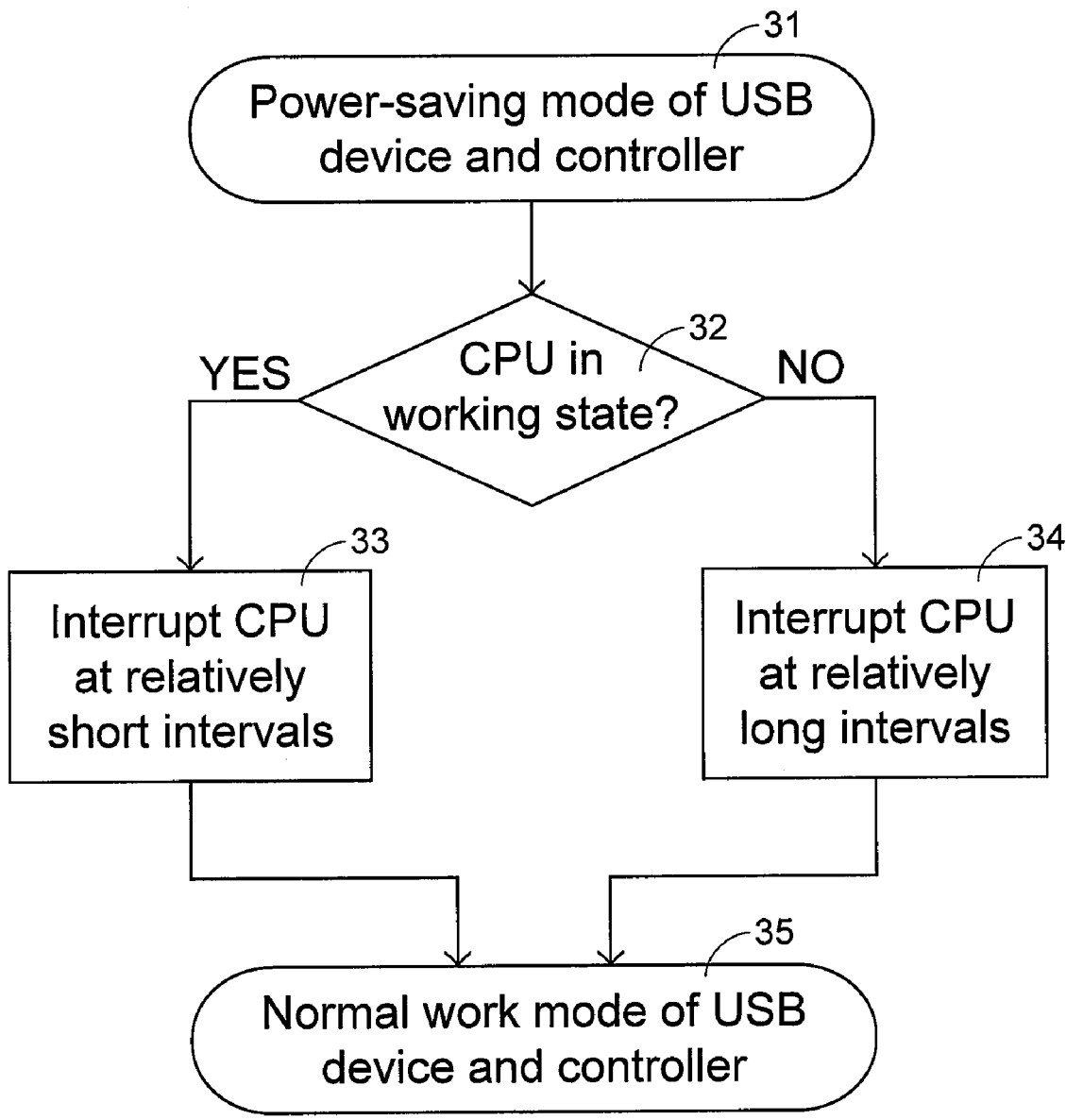
FIG. 3(a) is a flowchart illustrating a method for adjusting power-saving strategy of USB device and controller according to a first embodiment of the present invention.

A flowchart for illustrating a method for adjusting power-state strategy according to an embodiment of the invention is shown in FIG. 3(a). In this embodiment, two kinds of intervals for triggering the CPU are involved. First of all, when the USB host controller and associated USB device(s) enter a power-saving mode (Step 31), the power management in the south bridge chip detects the state of the CPU to determine whether the CPU is in a working state or not (Step 32). The USB host controller will interrupt the CPU to read task-related data from the main memory at relative short intervals (Step 33) if the CPU is in a working state, and interrupt the CPU at relative long intervals if the CPU is not in a working state but in an idle state (Step 34) until the USB controller and device(s) restore from the power-saving mode (Step 35). In this way, the power-saving strategy may vary with the states of the CPU.

Figure 3B:
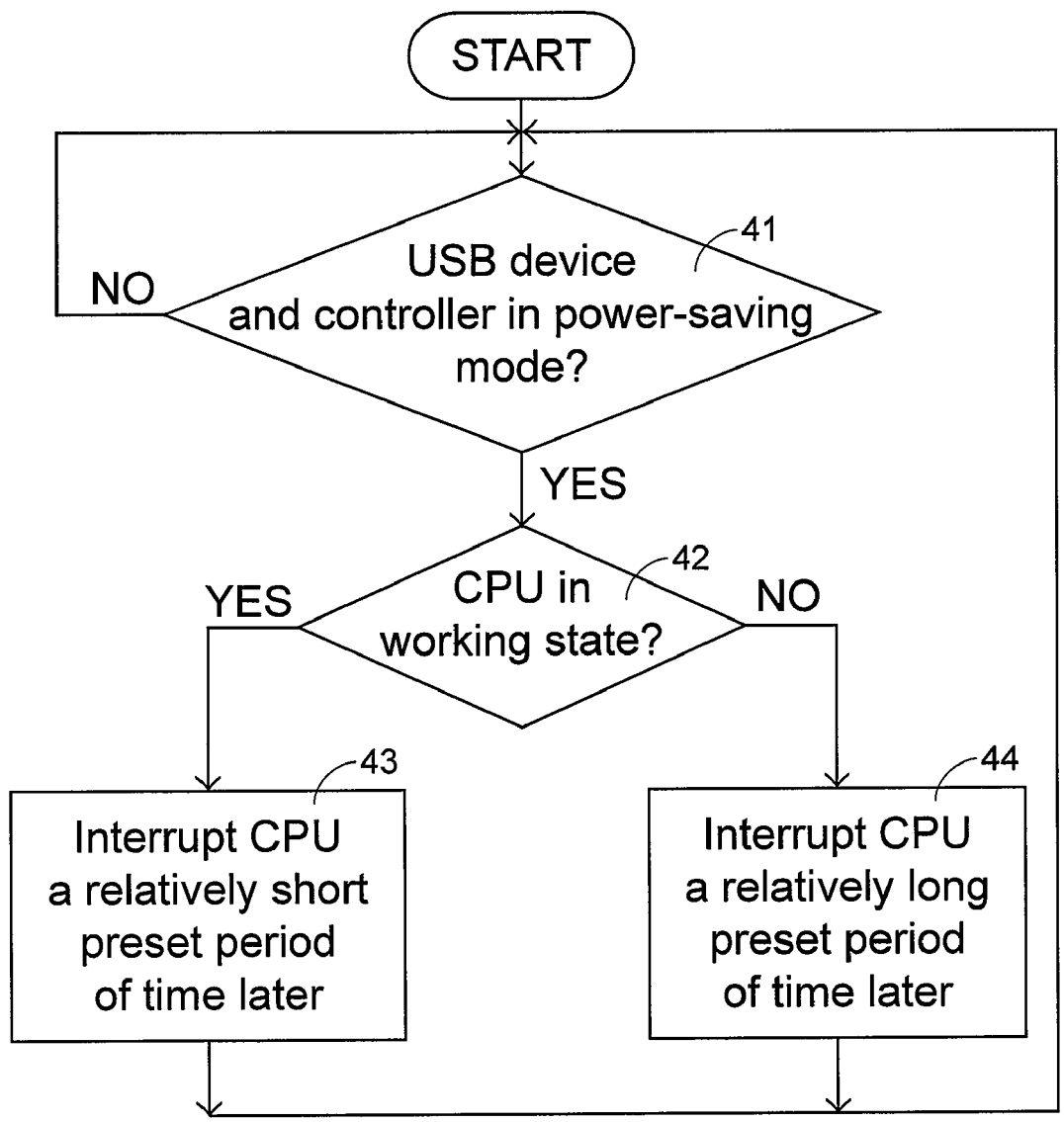
FIG. 3(b) is a flowchart illustrating a method for adjusting power-saving strategy of USB device and controller according to a second embodiment of the present invention.

In the above embodiment, the CPU-triggering steps are executed at respective intervals (Steps 33 and 34) until the USB host controller restores from the power-saving mode. In an alternative embodiment, as shown in FIG. 3(b), the state of the CPU is cyclically detected during the power-saving mode of the USB host controller, thereby dynamically adjusting the intervals. In other words, after the USB host controller interrupts the CPU to read task-related data from the main memory a relatively short period of time after entering the power-saving mode (Step 43) or interrupts the CPU a relatively long period of time after entering the power-saving mode (Step 44), the state the CPU is checked again (Step 42) and proper strategy is adopted (Step 43 or 44) as long as the USB controller and device(s) are still in the power-saving mode (Step 41).

In current computer architectures, if a CPU is not in the working state (so-called C0 state), the CPU may be in one of different idle states, e.g. C1, C2 and C3 states involving decreasing power-saving levels, instead of a fixed idle state. The variable idle states depend on the utilization levels of the CPU. Accordingly, in another embodiment of the present invention, the method for adjusting power-saving strategy provides more than one kind of intervals to obtain good balance between performance of the USB devices and power-saving effect of the CPU.

Figure 4A:
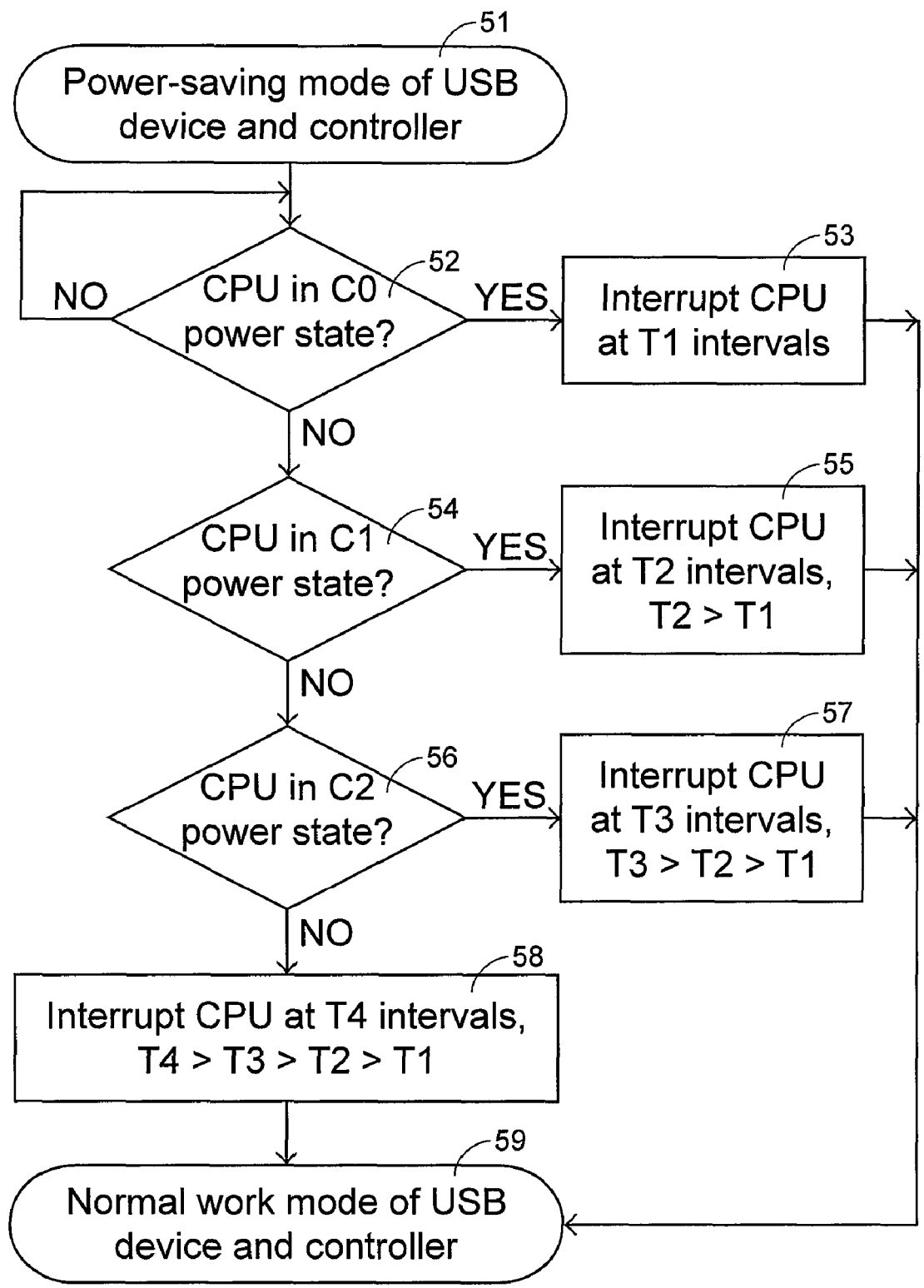
FIG. 4(a) is a flowchart illustrating a method for adjusting power-saving strategy of USB device and controller according to a third embodiment of the present invention.

Please refer to the flowchart of FIG. 4(a). When the USB host controller and associated USB device(s) enter a power-saving mode (Step 41), the power management in the south bridge chip detects the state of the CPU to determine whether the CPU is in a working state or not (Step 42). If the CPU is in a working state, the USB host controller will interrupt the CPU to read task-related data from the main memory at T1 intervals (Step 43). If the CPU is not in a working state but in a first idle state, e.g. C1 power state (Step 44), the USB host controller will interrupt the CPU to read task-related data from the main memory at T2 intervals (Step 45). If the CPU is not in the C1 power state but in a second idle state, e.g. C2 power state (Step 46), the USB host controller will interrupt the CPU to read task-related data from the main memory at T3 intervals (Step 47). Otherwise, the CPU is determined to be in a third idle state, e.g. C3 power state and the USB host controller will interrupt the CPU to read task-related data from the main memory at T4 intervals (Step 48). In this way, the power-saving strategy may vary with the states of the CPU.

Figure 4B:
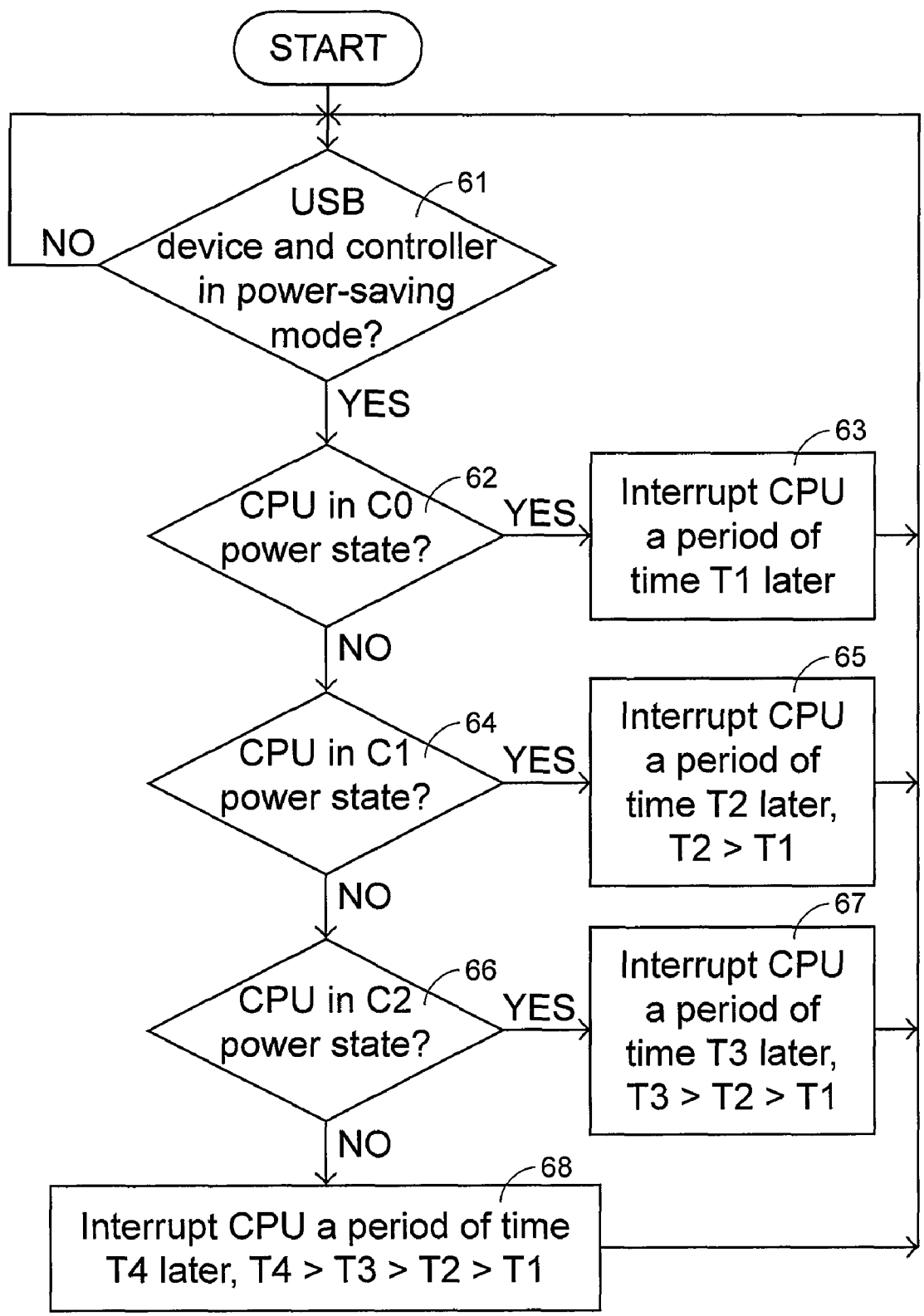
FIG. 4(b) is a flowchart illustrating a method for adjusting power-saving strategy of USB device and controller according to a fourth embodiment of the present invention.

In the embodiment of FIG. 4(a), the CPU-triggering steps are executed at respective intervals (Steps 43, 45, 47 and 48) until the USB host controller restores from the power-saving mode. In an alternative embodiment, as shown in FIG. 4(b), the state of the CPU is cyclically detected during the power-saving mode of the USB host controller, thereby dynamically adjusting the intervals. In other words, after the USB host controller interrupts the CPU to read task-related data from the main memory a period of time after entering the power-saving mode (Step 53, 55, 57 or 58), the state the CPU is checked again (Step 52, 54 and/or 56) and proper strategy is adopted (Step 53, 55, 57 or 58) as long as the USB controller and device(s) are still in the power-saving mode (Step 51).

By varying the intervals for triggering or interrupting the CPU (T4>T3>T2>T1), the performance of the USB devices need not be sacrificed in order to rest the CPU. Aside from, the redundant interruption of the CPU can be reduced.

In the above embodiments, USB-associated devices are exemplified for illustrating the method and device for adjusting power-saving strategy of the present invention. However, it is not intended to confine the use of the present method and device. Instead, the present method and device may apply to any other peripheral device having an interactive power-saving effect with the CPU.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for adjusting power-saving strategy of a computer system, comprising:
   determining whether a CPU of the computer system is in a working state by a south bridge chip of the computer system during a power-saving mode of a peripheral device;
   interrupting the CPU at relatively short intervals to acquire data required for the peripheral device to determine whether or not to execute any task when the CPU is determined to be in the working state;
   interrupting the CPU and directly restoring the CPU to the working state at relatively long intervals to acquire data required for the peripheral device to determine whether or not to execute any task when the CPU is determined to be not in the working state; and
   restoring the peripheral device from the power-saving mode when there is a task to be executed;
   wherein the CPU is interrupted by a timer in a peripheral device controller, and the interrupt intervals of the timer are adjusted by the peripheral device controller according to whether the CPU is in the working state.

2. The method according to claim 1 wherein the CPU involves in two or more idle states, and the peripheral device controller for controlling the peripheral device interrupts the CPU in one of the idle states, which supports more active peripheral devices than in other idle states, at shorter intervals.

3. The method according to claim 1 wherein the peripheral device controller for controlling the peripheral device interrupts the CPU at T1 intervals during the power-saving mode if the CPU is in a C0 power state, interrupts the CPU at T2 intervals during the power-saving mode if the CPU is in a C1 power state, interrupts the CPU at T3 intervals during the power-saving mode if the CPU is in a C2 power state, and interrupts the CPU at T4 intervals during the power-saving mode if the CPU is in a C3 power state, where $T4>T3>T2>T1$, wherein C0 indicates the working state of the CPU, and C1, C2 and C3 indicate different levels of power saving states of the CPU.

4. The method according to claim 1 wherein the CPU is interrupted in response to a data-reading signal issued by the peripheral device controller for controlling the peripheral device to read descriptor data from a system memory of the computer system.

5. The method according to claim 1 further comprising cyclically detecting the state of the CPU during the power-saving mode of the peripheral device so that the interruption timing of the CPU is dynamically adjusted according to the state of the CPU.

6. A core logic chip of a computer system, comprising:
   a power management controller in communication with a CPU of the computer system for detecting a power state of the CPU; and
   a peripheral device controller in communication with the power management controller and the CPU, interrupting the CPU and directly restoring the CPU to a working state at relatively short intervals during a power-saving mode of the peripheral device to acquire data required for the peripheral device to determine whether or not to execute any task when the CPU is determined to be in a relatively high power state though the power management controller, interrupting the CPU and directly restoring the CPU to the working state at relatively long intervals during the power-saving mode of the peripheral device to acquire data required for the peripheral device to determine whether or not to execute any task when the CPU is determined to be in a relatively low power state, and restoring from the power-saving mode when there is a task to be executed;
   wherein the relatively high power state and the relatively low power state are different levels of power saving states of the CPU;
   wherein the interruptings of the CPU are triggered by a timer in the peripheral device controller, and the interrupt intervals of the timer are adjusted by the peripheral device controller according to the different power states of the CPU.

7. The core logic chip according to claim 6 wherein the peripheral device controller interrupts the CPU at T1 intervals during the power-saving mode if the CPU is in a C0 power state, interrupts the CPU at T2 intervals during the power-saving mode if the CPU is in a C1 power state, interrupts the CPU at T3 intervals during the power-saving mode if the CPU is in a C2 power state, and interrupts the CPU at T4 intervals during the power-saving mode if the CPU is in a C3 power state, where $T4>T3>T2>T1$, wherein C0 indicates the working state of the CPU, and C1, C2 and C3 indicate different levels of power saving states of the CPU.

8. The core logic chip according to claim 7 wherein the timer in the peripheral device controller is for counting the interval T1, T2, T3 or T4.

9. The core logic chip according to claim 6 wherein the CPU is interrupted in response to a data-reading signal issued by the peripheral device controller to read descriptor data from a system memory of the computer system.

10. The core logic chip according to claim 6 wherein the power management controller and the peripheral device controller are both disposed in a south bridge chip of the core logic chip.

11. The core logic chip according to claim 6 wherein the power state of the CPU is cyclically detected during the power-saving mode of the peripheral device controller so that the interruption timing of the CPU is dynamically adjusted according to the power state of the CPU.

12. A computer system with adjustable power-saving strategy, comprising:
   a CPU being in a power state variable with a number of active peripheral devices supported thereby;
   one or more peripheral devices functioning with an operation of the CPU; and
   a core logic chip in communication with the CPU and the peripheral devices, comprising:
      a power management controller in communication with the CPU of the computer system for detecting the power state of the CPU; and
      a peripheral device controller in communication with the power management controller and a peripheral device, interrupting the CPU and directly restoring the CPU to a working state at relatively short intervals during a power-saving mode of the peripheral device to acquire data required for the peripheral device to determine whether or not to execute any task when the CPU is determined to be in a relatively high power state though the power management controller, interrupting the CPU and directly restoring the CPU to the working state at relatively long intervals during the power-saving mode of the peripheral device to acquire data required for the peripheral device to determine whether or not to execute any task when the CPU is determined to be in a relatively low power state, and restoring from the power-saving mode when there is a task to be executed;

wherein the relatively high power state and the relatively low power state are different levels of power saving states of the CPU;

wherein the interruptings of the CPU are triggered by a timer in the peripheral device controller, and the interrupt intervals of the timer are adjusted by the peripheral device controller according to the different power states of the CPU.

13. The computer system according to claim 12 wherein the peripheral device controller interrupts the CPU at T1 intervals during the power-saving mode if the CPU is in a C0 power state, interrupts the CPU at T2 intervals during the power-saving mode if the CPU is in a C1 power state, interrupts the CPU at T3 intervals during the power-saving mode if the CPU is in a C2 power state, and interrupts the CPU at T4 intervals during the power-saving mode if the CPU is in a C3 power state, where T4>T3>T2>T1, wherein C0 indicates the working state of the CPU, and C1, C2 and C3 indicate different levels of power saving states of the CPU.

14. The computer system according to claim 13 wherein the timer in the peripheral device controller is for counting the interval T1, T2, T3 or T4.

15. The computer system according to claim 12 further comprising a system memory in communication with the CPU via a north bridge chip of the core logic chip, wherein the CPU is interrupted in response to a data-reading signal issued by the peripheral device controller to read descriptor data from the system memory.

16. The computer system according to claim 12 wherein the power management controller and the peripheral device controller are both disposed in a south bridge chip of the core logic chip.

17. The computer system according to claim 12 wherein the power state of the CPU is cyclically detected during the power-saving mode of the peripheral device so that the interruption timing of the CPU is dynamically adjusted according to the power state of the CPU.

18. The computer system according to claim 17 wherein the peripheral device is a USB device.

* * * * *